(12) United States Patent
Dong et al.

(10) Patent No.: US 11,391,882 B2
(45) Date of Patent: Jul. 19, 2022

(54) OPTICAL WAVEGUIDE ELEMENT AND CONTROL METHOD THEREOF, BACKLIGHT MODULE AND DISPLAY DEVICE

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Ruijun Dong, Beijing (CN); Hao Zhang, Beijing (CN); Chenru Wang, Beijing (CN); Lili Chen, Beijing (CN); Xuebing Zhang, Beijing (CN); Yali Liu, Beijing (CN); Junjie Miao, Beijing (CN); Ke Li, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 417 days.

(21) Appl. No.: 16/473,142

(22) PCT Filed: Dec. 11, 2018

(86) PCT No.: PCT/CN2018/120342
§ 371 (c)(1),
(2) Date: Jun. 24, 2019

(87) PCT Pub. No.: WO2019/184446
PCT Pub. Date: Oct. 3, 2019

(65) Prior Publication Data
US 2021/0356646 A1 Nov. 18, 2021

(30) Foreign Application Priority Data
Mar. 30, 2018 (CN) .......................... 201810276475.1

(51) Int. Cl.
*G02B 6/00* (2006.01)
*F21V 8/00* (2006.01)
(Continued)

(52) U.S. Cl.
CPC .......... *G02B 6/0055* (2013.01); *G02B 6/002* (2013.01); *G02B 6/0096* (2013.01); *G02B 6/3512* (2013.01); *G02F 1/011* (2013.01)

(58) Field of Classification Search
CPC .... G02B 6/0055; G02B 6/002; G02B 6/0096; G02B 6/3512; G02F 1/011
(Continued)

(56) References Cited

U.S. PATENT DOCUMENTS 5,543,958 A * 8/1996 Lebby ............... G02F 1/133615
359/254
6,972,882 B2 12/2005 Ring et al.
(Continued)

FOREIGN PATENT DOCUMENTS

| CN | 1530679 A | 9/2004 |
|---|---|---|
| CN | 101424768 A | 5/2009 |

(Continued)

OTHER PUBLICATIONS

International Search Report of PCT/CN2018/120342 in Chinese, dated Feb. 27, 2019, with English translation.
(Continued)

*Primary Examiner* — Jerry M Blevins
(74) *Attorney, Agent, or Firm* — Collard & Roe, P.C,

(57) ABSTRACT

An optical waveguide element and control method thereof, a backlight module and a display device. The optical waveguide element includes a cavity, a light incident surface and a light emergent surface, light entering the cavity from the light incident surface is configured to propagate and be totally reflected in the cavity; and a reflector array, located
(Continued)

in the cavity and configured to be controllable to cause at least a part of the light incident on the reflector array to be reflected out of the light emergent surface or to continue being totally reflected at the light emergent surface.

19 Claims, 4 Drawing Sheets

(51) Int. Cl.
   *G02B 6/35* (2006.01)
   *G02F 1/01* (2006.01)
(58) Field of Classification Search
   USPC .......................................................... 385/14
   See application file for complete search history.

(56) References Cited

U.S. PATENT DOCUMENTS

| | | |
|---|---|---|
| 7,880,826 B2 | 2/2011 | Guo et al. |
| 8,388,209 B2 | 3/2013 | Cornelissen et al. |
| 9,470,834 B2 | 10/2016 | Wang |
| 2014/0140091 A1* | 5/2014 | Vasylyev ............. G02B 6/0061 |
| | | 362/606 |
| 2018/0267150 A1* | 9/2018 | Inada ..................... G02B 6/005 |
| 2019/0212543 A1 | 7/2019 | Li |

FOREIGN PATENT DOCUMENTS

| | | |
|---|---|---|
| CN | 101852362 A | 10/2010 |
| CN | 102062334 A | 5/2011 |
| CN | 104503016 A | 4/2015 |
| CN | 205227050 U | 5/2016 |
| CN | 105911737 A | 8/2016 |
| CN | 108287390 A | 7/2018 |
| JP | H08220344 A | 8/1996 |
| JP | 2008209779 A | 9/2008 |

OTHER PUBLICATIONS

Notice of Transmittal of the International Search Report of PCT/CN2018/120342 in Chinese, dated Feb. 27, 2019.
Written Opinion of the International Searching Authority of PCT/CN2018/120342 in Chinese, dated Feb. 27, 2019 with English translation.
Chinese Office Action in Chinese Application No. 201810276475.1, dated Mar. 29, 2019 with English translation.

* cited by examiner

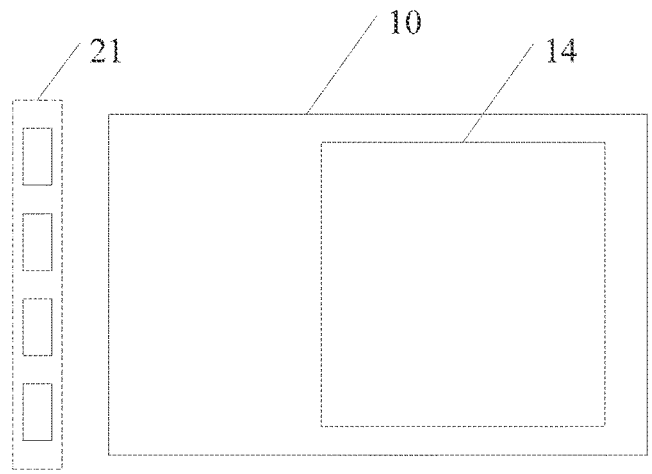

FIG.7

801
a first reflector assembly in the reflector array is controlled to be switched on, so that the light totally reflected to the first reflector assembly and having an incident angle less than a preset angle is directed out of a light emergent surface in the optical waveguide element 802
a second reflector assembly in the reflector array is controlled to be switched off, so that the light totally reflected to the second reflector assembly continue being totally reflected within the optical waveguide element

FIG.8

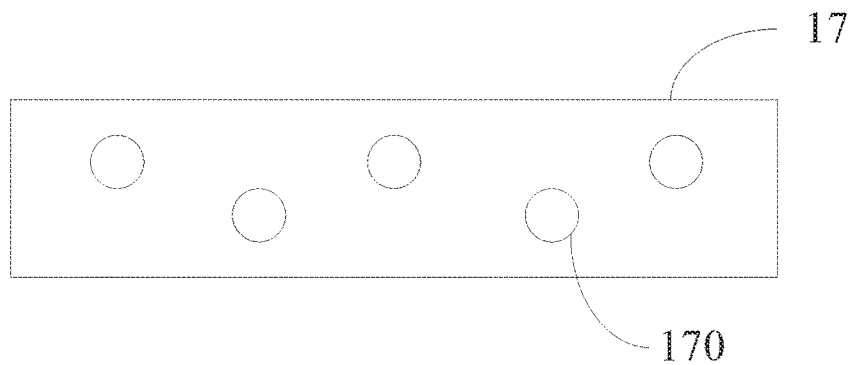

FIG.9

OPTICAL WAVEGUIDE ELEMENT AND CONTROL METHOD THEREOF, BACKLIGHT MODULE AND DISPLAY DEVICE

CROSS REFERENCE TO RELATED APPLICATIONS

This application is the National Stage of PCT/CN2018/120342 filed on Dec. 11, 2018, which claims priority under 35 U.S.C. § 119 of Chinese Application No. 201810276475.1 filed on Mar. 30, 2018, the disclosure of which is incorporated by reference.

TECHNICAL FIELD

Embodiments of the present disclosure relate to the field of display technology, especially an optical waveguide element and control method thereof, a backlight module and a display device.

BACKGROUND

A display device generally includes a backlight module, a display panel and other configurations, and in the display device, the backlight module serves for providing a required light source to the display panel, so as to realize normal display of the display device.

SUMMARY

According to embodiments of the present disclosure, there are provided an optical waveguide element and control method thereof, a backlight module and a display device.

According to first aspect of the present disclosure, it is provided an optical waveguide element, comprising
  a cavity;
  a light incident surface and a light emergent surface, a light entering the cavity from the light incident surface is configured to propagate and be totally reflected in the cavity; and
  a reflector array, located in the cavity and configured to be controllable to cause at least a part of the light incident on the reflector array to be reflected out of the light emergent surface or to continue being totally reflected at the light emergent surface.

In at least some embodiments, the reflector array comprises a plurality of reflecting assemblies arranged in an array, each of the reflecting assemblies comprises a reflector, the reflector is deflectable and configured to reflect at least a part of the light incident on the reflector out of the light emergent surface while the reflector is in a first state.

In at least some embodiments, the reflector is configured to reflect at least a part of the light incident on the reflector and has an incident angle smaller than a preset angle out of the light emergent surface.

In at least some embodiments, the reflector is further configured to cause at least a part of the light incident on the reflector to continue being totally reflected at the light emergent surface while the reflector in a second state.

In at least some embodiments, the reflector in each of the reflector assemblies is configured to be inclined relative to the light emergent surface in the first state, and to be parallel to the light emergent surface in the second state.

In at least some embodiments, each of the reflecting assemblies further comprises: a connecting member, connected to each reflector and configured to control a deflection angle of the reflector; and a control circuit, coupled to the connecting member and configured to input a reflector deflection signal to the connecting member.

In at least some embodiments, a minimum distance between the reflector array and the light incident surface is set in such a way that the light entering the cavity from the light incident surface are incident on the reflector array after the light undergoes multiple-time total reflection.

In at least some embodiments, the optical waveguide element further comprises: a bottom plate, disposed opposite to the light emergent surface; a medium, filled in the cavity; and a packaging surface, disposed opposite to the light incident surface and provided with a hole, the hole being configured for injection of the medium.

In at least some embodiments, the light incident surface is a slop surface, the slop surface is inclined relative to the bottom plate, and an angle between the light incident surface and the light emergent surface is an obtuse angle.

In at least some embodiments, the optical waveguide element further comprises: a first connecting surface, wherein the light incident surface extends beyond the light emergent surface, the first connecting surface is joined to the light emergent surface and one end of the light incident surface extending beyond the light emergent surface, respectively, and the cavity is enclosed by the light incident surface, the first connecting surface, the light emergent surface, the bottom plate, and the packaging surface to form a closed cavity.

In at least some embodiments, the light incident surface is directly connected to the light emergent surface and the bottom plate, respectively, and the cavity is enclosed by the light incident surface, the light emergent surface, the bottom plate, and the packaging surface to form a closed cavity.

In at least some embodiments, the medium is a liquid medium, the liquid medium is configured to allow the light entering the light incident surface to propagate in the liquid medium and allow at least a part of the light to be totally reflected, the reflector array is located in the liquid medium.

In at least some embodiments, a refractive index of a material of the light emergent surface is greater than a refractive index of the liquid medium, and a difference between the refractive index of the material of the light emergent surface and the refractive index of the liquid medium is less than 0.3.

In at least some embodiments, a refractive index of a material of the light emergent surface is equal to a refractive index of the liquid medium.

According to second aspect of the present disclosure, it is provided a backlight module, comprising
  a light source; and
  an optical waveguide element according to any one of claims 1 to 14, the light source and a light incident surface of the optical waveguide element being disposed opposite to each other.

In at least some embodiments, the backlight module further comprises a collimating element disposed between the light source and the optical waveguide element, wherein the collimating element is configured to convert a light emitted by the light source into a collimated light, and the collimated light are incident on the light incident surface of the optical waveguide element.

According to third aspect of the present disclosure, it is provided a display device comprising the afore-mentioned backlight module According to fourth aspect of the present disclosure, it is provided a control method of the afore-mentioned optical waveguide element, the method comprises:

controlling reflectors in the reflector array to cause at least a part of light incident on the reflector array to be reflected out of a light emergent surface or to continue being totally reflected at the light emergent surface.

At least in some embodiments, the controlling reflectors in the reflector array comprises: deflecting the reflectors, the reflectors being configured to be inclined relative to the light emergent surface and to reflect the lights totally reflected and being incident on the reflectors out of the light emergent surface.

At least in some embodiments, the controlling reflectors in the reflector array comprises: deflecting the reflectors, the reflectors being configured to be parallel to the light emergent surface and to cause the lights totally reflected and being incident on the reflectors to continue being totally reflected by the light emergent surface.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 7 is a top view illustrating a backlight module according to an embodiment of the present disclosure;

FIG. 8 is a flowchart illustrating a control method of an optical waveguide element according to an embodiment of the present disclosure;

FIG. 9 is a structurally schematic diagram illustrating a packaging surface according to an embodiment of the present disclosure;

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In an HDR (High Dynamic Range) backlight module, a plurality of LEDs (Light Emitting Diodes) are densely arranged below a display panel. Due to the fact that the backlight brightness is dynamically adjustable, a larger brightness adjustment range is realized, and thus the contrast is promoted. However, because the emission range of lights emitted by a LED is approximately 120°, a problem of mutual crosstalk between outgoing lights occurs to LEDs of different sections in the HDR backlight module.

Figure 1:
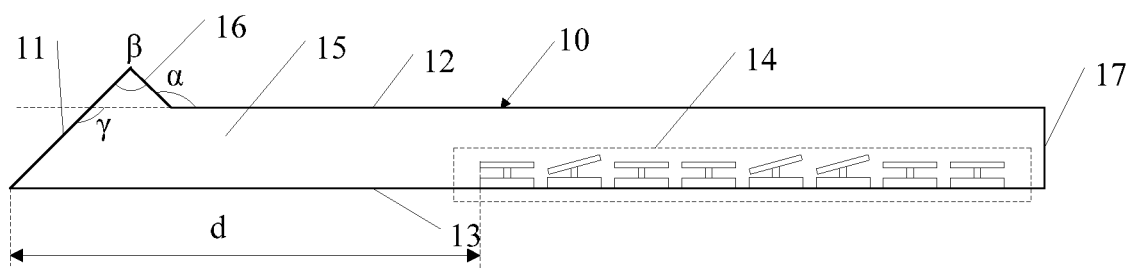
FIG. 1 is a structurally schematic diagram illustrating an optical waveguide element according to an embodiment of the present disclosure.

Referring to FIG. 1, it is a structurally schematic diagram illustrating an optical waveguide element according to an embodiment of the present disclosure.

According to an embodiment of the present disclosure, there is provided an optical waveguide element, including: a cavity 10; an light incident surface 11 and a light emergent surface 12, a light entering the cavity 10 from the light incident surface 11 propagates and is totally reflected in the cavity 10; and a reflector array 14, located in the cavity 10 and configured to be controllable to cause at least a part of the light incident on the reflector array 14 to be reflected out of the light emergent surface or to continue being totally reflected at the light emergent surface 12.

In the above embodiment, by arranging a reflector array in the optical waveguide element, a part of the totally reflected light incident on the reflector array is directed out of the light emergent surface; alternatively, a part of the totally reflected light incident on the reflector array can continue being totally reflected at the light emergent surface. In this way, collimation degree of lights emitted from the light emergent surface is increased, a mutual crosstalk problem between adjacent sections of the backlight module is effectively solved, and moreover, it is suitable for anti-peep, directional backlight modules or other products.

In at least some embodiments, the reflector array includes a plurality of reflecting assemblies arranged in an array, and each of the reflecting assemblies includes a reflector. The reflector is deflectable and configured to reflect at least a part of light incident on the reflector out of the light emergent surface while the reflector is in a first state.

Figure 4:
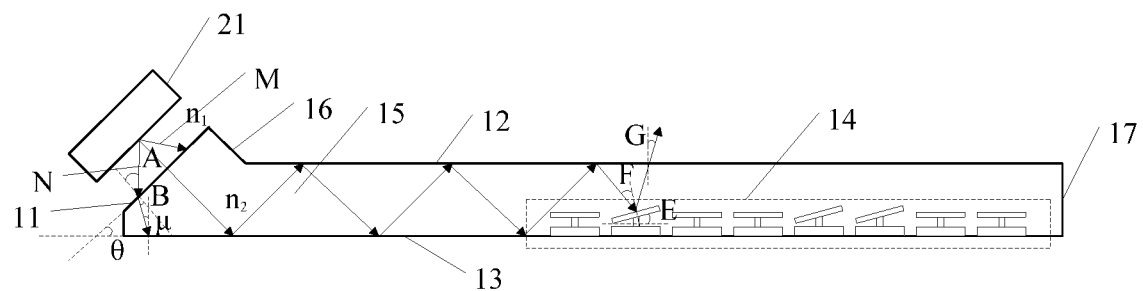
FIG. 4 is a diagram illustrating the principle of increasing the collimation degree of outgoing lights for an optical waveguide element in an embodiment of the present disclosure.
Figure 5:
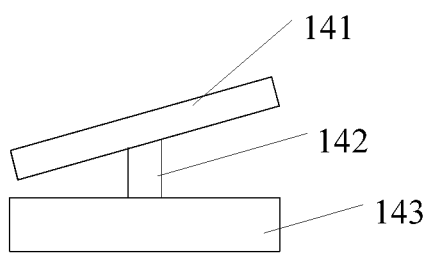
FIG. 5 is a structurally schematic diagram illustrating a reflector assembly in a first state in an embodiment of the present disclosure.

For example, as illustrated in FIG. 4 and FIG. 5, the reflector array 14 includes a plurality of reflecting assemblies arranged in an array, and each of the reflecting assemblies includes a reflector 141 which is deflectable. While the reflector 141 is in the first state (for example, the reflector 141 is tilted relative to a light emergent surface 12), the reflector 141 reflects at least a part of light incident on the reflector 141 out of the light emergent surface 12. In an embodiment of the present disclosure, the reflector is of planar shape, and in other embodiment, the reflector may also be other configuration, such as a triangular pyramid, or the like. In the present disclosure, the deflection angle of a reflector refers to a deflection angle of a reflecting surface of the reflector, and the angle between a reflector and a light emergent surface refers to an angle between the reflecting surface of the reflector and the light emergent surface. The present disclosure does not limit the concrete configuration of a supporting structure of the reflector.

Figure 3:
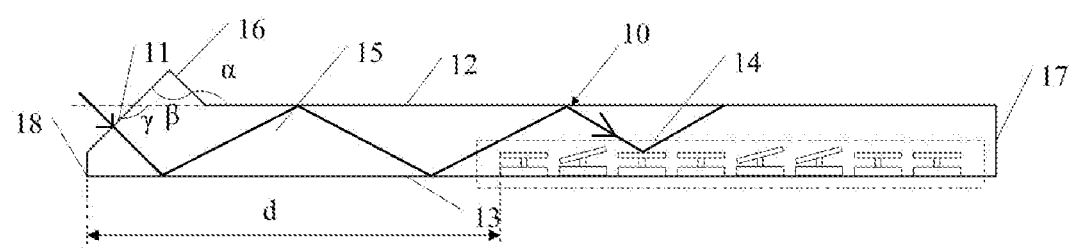
FIG. 3 is a structurally schematic diagram illustrating still another optical waveguide element according to an embodiment of the present disclosure.

In at least some embodiments, the reflector is further configured to cause at least a part of light incident on the reflector to be totally reflected at the light emergent surface while the reflector is in a second state. For example, as illustrated in FIG. 3, while the reflector is in the second state (for example, a reflector 141 and a light emergent surface 12 are parallel to each other), the reflector 141 causes at least a part of light incident on the reflector to be totally reflected at the light emergent surface.

In at least some embodiments, the reflector in the first state reflects at least a part of light out of the light emergent surface, herein, the at least a part of light incident on the reflector has an incident angle smaller than a preset angle. In at least some embodiments, the reflector in the second state causes at least a part of light to continue being totally reflected at the light emergent surface, herein, the at least part of lights incident on the reflector has an incident angle greater than a preset angle.

Herein, the term "incident angle" refers to an incident angle at which a light entering a cavity 10 of the optical waveguide element is incident on a reflector 141. Term "preset angle" refers to a critical angle about whether or not the light totally reflected to a reflector 141 can be emitted from a light emergent surface 12 after the light is reflected by the reflector 141, so the preset angle has an effect on the collimation degree of lights emitted from the light emergent surface 12. In the case that the light totally reflected to a reflector 141 has an incident angle less than the preset angle, the light can exit the light emergent surface after being reflected by the reflector 141. In the case that the light totally reflected to a reflector 141 has an incident angle greater than the preset angle, the light cannot exit the light emergent surface after being reflected by the reflector 141, instead, the light continues being totally reflected in the cavity of the optical waveguide element.

In at least some embodiments, each of the reflecting assemblies further includes a connecting member, the connecting member is connected to each of the reflectors and is configured to control deflection angle of the reflector; each of the reflecting assemblies further includes a control circuit, the control circuit is coupled with the connecting member and is configured to input a reflector deflection signal to the connecting member.

In at least some embodiments, the optical waveguide element further includes a bottom plate, the bottom plate is disposed opposite to the light emergent surface; the optical waveguide element further includes a medium filled in the cavity; the optical waveguide element further includes an packaging surface, the packaging surface is disposed opposite to the light incident surface and is provided with a hole for injection of the medium.

As illustrated in FIG. 4, the reflector array 14 includes a plurality of reflector assemblies arranged in an array, and the plurality of reflector assemblies are disposed on the bottom plate 13 of the cavity 10. For example, as illustrated in FIG. 5, a reflector assembly includes a reflector 141, a connecting member 142, and a control circuit 143. The reflector 141 is arranged between the control circuit 143 and a top of the optical waveguide element, and the control circuit 143 is coupled with the reflector 141 via the connecting member 142, and is configured to control deflection of the reflector 141 by means of controlling motion of the connecting member 142.

It is to be noted that, the connecting member 142 is not merely a vertical portion in FIG. 5, and all connecting configurations between the reflector 141 and the control circuit 143 belong to the connecting member 142.

Figure 6:
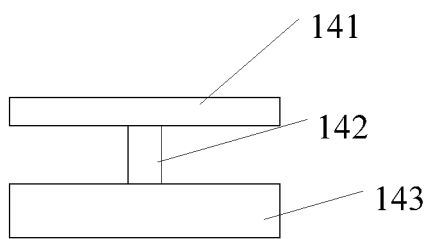
FIG. 6 is a structurally schematic diagram illustrating a reflector assembly in a second state in an embodiment of the present disclosure.

For example, as illustrated in FIG. 5, in the case that the reflector assembly is in switch-on state, the reflector 141 is deflected to a designated tilt position, such that the light which is totally reflected to the reflector assembly and having an incident angle less than a preset angle are reflected out of the light emergent surface 12. For another example, as illustrated in FIG. 6, in the case that the reflector assembly is in switch-off state, the reflector 141 and the light emergent surface 12 are parallel to each other, and the lights totally reflected to the reflector assembly continues being totally reflected in the optical waveguide element. The preset angle is related to an angle $\theta$, the deflection angle of a reflector, and the required angle of an outgoing light, and embodiments of the present disclosure do not set a limit to this.

The reflector assembly may be switched on or switched off according to the actual demands in a corresponding place, each of the reflector assemblies corresponds to one pixel, and all of the reflector assemblies are switched on, a planar light source is formed.

For example, as illustrated in FIG. 1, the optical waveguide element is a hollow structure, that is, it has a cavity 10, and the light incident surface 11 of the optical waveguide element is a oblique plane, which makes an angle between the light incident surface 11 and the light emergent surface 12 of the optical waveguide element be an obtuse angle. The optical waveguide element further includes a reflector array 14 located within the cavity 10, and the reflector array 14 is located on a bottom plate 13 of the optical waveguide element far away from the region where the oblique plane 11 is located. The reflector array 14 is configured to reflect lights which are totally reflected to the reflector array 14 and having incident angle less than a preset angle out of the light emergent surface 12. The optical waveguide element further includes a liquid medium 15 filled within the cavity 10, and the liquid medium 15 allows the lights entering the cavity from the light incident surface to propagate in the liquid medium and allows at least a part of the light to be totally reflected. The reflector array 14 is located in the liquid medium 15.

For example, the bottom plate 13 and the light emergent surface 12 of the optical waveguide element are arranged in parallel with each other, and the angle $\gamma$ between the light incident surface 11 and the light emergent surface 12 is an obtuse angle. As illustrated in FIG. 1, the light incident surface 11 is not joined to the light emergent surface 12 directly. Assuming that the light emergent surface 12 is horizontally extended to be jointed to the light incident surface 11, then the angle $\gamma$ between the light incident surface 11 and the light emergent surface 12 and facing towards the bottom plate side is an obtuse angle. The minimum distance between the reflector array 14 and the region where the oblique plane 11 is located is d, and the minimum distance d is set such that the lights entering the cavity 10 from the light incident surface are incident on the reflector array 14 after being totally reflected for multiple times.

For example, in the optical waveguide element illustrated in FIG. 1, the light incident surface 11 extends beyond the light emergent surface 12, and the optical waveguide element further includes a first connecting surface 16. The first connecting surface 16 is joined to the light emergent surface 12 and one end of the light incident surface 11 that extends beyond the light emergent surface 12, respectively, so that the optical waveguide element forms a closed structure. That is, the cavity 10 is a closed cavity which is enclosed by the light incident surface 11, the first connecting surface 16, the light emergent surface 12, the bottom plate 13 and the packaging surface 17. For example, the angle α formed between the first connecting surface 16 and the light emergent surface 12 is an obtuse angle, and the angle β formed between the first connecting surface 16 and the light incident surface 11 is an acute angle. For example, the angle α is greater than 90° and less than 180°, and the angle β is greater than 0° and less than 90°.

For example, the light incident surface 11 extends in a direction toward the light emergent surface 12, so that in the vertical direction (that is, the vertical direction is perpendicular to the bottom plate 13), height of the extended end of the light incident surface 11 is higher than height of the light emergent surface 12.

For example, by means of setting the angle α formed between the first connecting surface 16 and the light emergent surface 12 to be an obtuse angle, and setting the angle β formed between the first connecting surface 16 and the light incident surface 11 to be an obtuse angle, the area of the light incident surface 11 can be increased, that is, light incident area of a light source is increased. For example, the angle α and the angle β are located on different sides of the optical waveguide element. The angle α refers to an exterior included angle between the first connecting surface 16 and the light emergent surface 12 and is located outside the optical waveguide element; the angle β refers to an interior included angle between the first connecting surface 16 and the light incident surface 11, and is located inside the optical waveguide element.

For example, a side of the first connecting surface 16 facing the liquid medium 15 is coated with a light absorption material. By coating the light absorption material on the first connecting surface 16, incident lights that are incident on the first connecting surface 16 and have a large viewing angle can be absorbed, thereby avoiding such a case that incident lights with large viewing angle enter the optical waveguide element, and interfere with the actually demanded lights.

Figure 2:
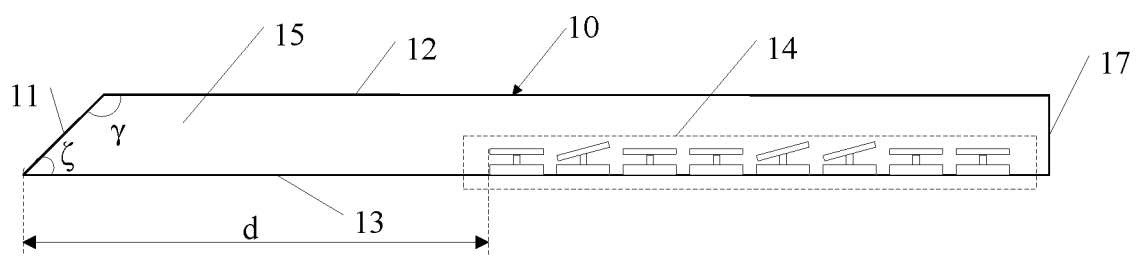
FIG. 2 is a structurally schematic diagram illustrating another optical waveguide element according to an embodiment of the present disclosure.

Referring to FIG. 2, it is a structurally schematic diagram illustrating another optical waveguide element according to an embodiment of the present disclosure.

In the optical waveguide element illustrated in FIG. 2, a light incident surface 11 is a slop surface, and the slop surface is inclined relative to the bottom plate 13, so that the angle γ formed between the light incident surface 11 and a light emergent surface 12 is an obtuse angle, and the angle formed between the light incident surface 11 and the bottom plate 13 of the optical waveguide element is an acute angle. For example, the angle γ is greater than 90° and less than 180°, and the angle is greater than 0° and less than 90°.

When lights emitted by a light source are incident on the light incident surface 11 and then enter the optical waveguide element, a part of the incident lights can be totally reflected within the optical waveguide element, this is because the light incident surface 11 is an oblique plane, the angle between the light incident surface 11 and the light emergent surface 12 is set to be an obtuse angle, and the angle between the light incident surface 11 and the bottom plate of the optical waveguide element is set to be an acute angle. For example, the angle γ refers to an interior included angle between the light incident surface 11 and the light emergent surface 12 and is located inside the optical waveguide element, and the angle refers to an interior included angle between the light incident surface 11 and the bottom plate 13 of the optical waveguide element and is also located inside the optical waveguide element.

The difference between the optical waveguide element illustrated in FIG. 2 and the optical waveguide element illustrated in FIG. 1 lies in that, the light incident surface 11 and the light emergent surface 12 in FIG. 1 are joined by a first connecting surface 16, and the light incident surface 11 in FIG. 2 is directly joined to the light emergent surface 12 with no first connecting surface 16 being provided. For example, in the case that the distance between the light emergent surface 12 and the bottom plate 13 of the optical waveguide element is the same in both FIG. 2 and FIG. 3, the area of the light incident surface 11 in FIG. 1 is larger than that of the light incident surface 11 in FIG. 2, and the light incident area of the light source can be increased by the optical waveguide element illustrated in FIG. 1.

For example, as illustrated in FIG. 1 and FIG. 2, a surface of the optical waveguide element which is opposite to the light incident surface 11 is a packaging surface 17, and the packaging surface 17 is located on a side of the reflector array 14 far away from the light incident surface 11.

As illustrated in FIG. 9, holes 170 are provided in the packaging surface 17; after a reflector array 14 has been arranged on a bottom plate 13 of an optical waveguide element, the optical waveguide element is packaged by the packaging surface 17. After the packaging surface 17 is packaged, a liquid medium 15 is injected via the holes 170 of the packaging surface 17, and then the holes 170 are sealed after the injection is completed. In this way, tightness of the optical waveguide element can be insured.

Referring to FIG. 3, it is a structurally schematic diagram illustrating still another optical waveguide element according to an embodiment of the present disclosure.

In the optical waveguide element illustrated in FIG. 3, the optical waveguide element further includes a second connecting surface 18, and the second connecting surface 18 extends to one end of a light incident surface 11 near a bottom plate 13 of the optical waveguide element, and is joined to the light incident surface 11 and the bottom plate 13 of the optical waveguide element, respectively, so that the optical waveguide element forms a closed structure. That is, the cavity is a closed cavity which is enclosed by the light incident surface 11, the light emergent surface 12, the bottom plate 13, and the packaging surface 17. The second connecting surface 18 may be arranged perpendicular to the bottom plate of the optical waveguide element. For example, an interior included angle between the second connecting surface 18 and the light incident surface 11 is an obtuse angle.

For example, the light incident surface 11 has a first end and a second end, and in the vertical direction, the distance between the first end and the bottom plate 13 of the optical waveguide element is greater than the distance between the second end and the bottom plate 13 of the optical waveguide element, as illustrated in FIG. 3; the first end of the light incident surface 11 is joined to the first connecting surface 16, and the second connecting surface 18 extends to the second end of the light incident surface 11 and is joined to the second end of the light incident surface 11.

Referring to FIG. 4, it is a diagram illustrating the principle of increasing collimation degree of outgoing lights for an optical waveguide element in an embodiment of the present disclosure.

The principle of increasing the collimation degree of outgoing lights for the optical waveguide element in an embodiment of the present disclosure will be explained by using the optical waveguide element of FIG. 3 as an example:

The refractive index of a medium outside the optical waveguide element is $n_1$, and the refractive index of a liquid medium within the optical waveguide element is $n_2$. As can be seen from the principle of total reflection, the critical angle C of total reflection within the optical waveguide element is: $C=\arcsin(n_1/n_2)$.

The center of a light source 21 is considered as a basic reference. The light N emitted downwardly from the light source 21 is incident on a light incident surface 11 of the light waveguide element at a first incident angle A, and according to the calculation formula of refractive index, a refraction angle B of the light N on the light incident surface 11 is: $B=\arcsin(n_1 \sin A/n_2)$.

The angle between the bottom plate 13 and the light incident surface 11 of the optical waveguide element is θ, and then a second incident angle μ at which the light N is incident on the bottom plate 13 of the optical waveguide element is: $\mu=\theta-B=\theta-\arcsin(n_1 \sin A/n_2)$.

If μ<C, that is, $\theta-\arcsin(n_1 \sin A/n_2)<\arcsin(n_1/n_2)$, total reflection will not take place, and part of the lights will be refracted and exit the optical waveguide element; if μ≥C, total reflection will take place within the optical waveguide element.

The larger the first incident angle A at which the light N is incident on the light incident surface 11 is, the smaller the second incident angle μ is. The smaller the first incident angle A is, the larger the second incident angle μ is. In this situation, lights with a larger first incident angle A may be filtered by setting the distance d between the reflector array 14 and the region where the light incident surface 11 is located, and lights with only a smaller first incident angle A are allowed to be totally reflected within the optical waveguide element. As a result, the collimation degree of lights entering the optical waveguide element can be increased.

If the light N can be totally reflected within the optical waveguide element and the deflection angle of a reflector array 14 is E, then an incident angle F of lights incident on the reflector array 14 is: $F=\mu-E$. The reflector array 14 in the optical waveguide element may adjust the light output direction. When the light N is directed out of the light emergent surface 12 by the reflector array 14, the emergent angle G of lights is: $G=F-E=\mu-2E$. Herein, the deflection angle E of the reflector array 14 is typically greater than 0° and less than 12°, and the light output direction is adjusted by the reflector array 14 within the optical waveguide element, thereby increasing the collimation degree of lights emitted by the optical waveguide element.

In addition, according to the actual demands, a preset distance d is adjustable, so that lights incident on the optical waveguide element undergo total reflection continually within the preset distance d. The lights propagate in a direction toward the reflector array 14 within the preset distance d, so that lights can be spread throughout the whole optical waveguide element. As a result, lights can be received by the entire reflector array 14.

For example, θ=45°, $n_1=1$, $n_2=1.6$, in the case that the first incident angle A>10.1°, total reflection of the light will not take place within the optical waveguide element, a part of light will leave the optical waveguide element by refraction. After going through a preset distance d, most of the light leaves the optical waveguide element by refraction, and then only the lights having a first incident angle A≤10.1° will be totally reflected to the reflector array 14 within the optical waveguide element. When the first incident angle A is 10.1°, the second incident angle μ is 38.68°, and when the first incident angle A is 0°, the second incident angle μ is 45°. Therefore, for the light N, the second incident angle μ ranges from 38.68° to 45°. If the deflection angle E of the reflector array 14 is 5°, then the incident angle F of the light incident on the reflector array 14 ranges from 33.68° to 40°, and the emergent angle G of the light ranges from 28.68° to 35°. The emergent angle of the light is smaller than the critical angle C, and is also smaller than the light emission range of 120° in the prior art, and thus the collimation degree of outgoing light can be increased.

The light M emitted upwardly from the light source 21 is incident on a light incident surface 11 of the optical waveguide element at a first incident angle A, and the light M has a refraction angle B after refraction. Then, the second incident angle μ at which the light M is incident on a bottom plate 13 of the optical waveguide element is: $\mu=\theta+B$. In the condition that θ=45°, $n_1=1$, and $n_2=1.6$, total reflection can be achieved for all the lights entering the optical waveguide element, regardless of the first incident angle of the lights incident on the light incident surface 11. However, in view of the fact that the larger the angle of light emitted by the light source 21 is (that is, the larger the first incident angle of the light incident on the light incident surface 11 is), the larger the second incident angle of the light incident on the bottom plate 13 of the optical waveguide element is, and then the larger the incident angle of the light M that are totally reflected to the reflector array 14 is, even if the reflector array 14 is switched on and the light M is reflected by the reflector array 14 to a light emergent surface 12, the total reflection is still not destroyed, and the light M will continue being totally reflected within the optical waveguide element. Only when the angle of light emitted by the light source 21 is smaller, the light M totally reflected to the reflector array 14 can be directed out of the light emergent surface 12 in condition that the reflector array 14 is switched on. The emergent angle of the light M that can be directed out of the light emergent surface 12 is less than the critical angle C. If the deflection angle E of the reflector array 14 is 5°, because the emergent angle G of the light M is $G=\theta+B-2E$, the emergent angle G of the light M ranges from 35° to 38.68°, which is smaller than the light emission range of 120° in the prior art. Thus, the collimation degree of lights emitted by optical waveguide elements can be increased.

For example, the angle θ in FIG. 4 and the angle in FIG. 2 may be equal to or different from each other.

When the collimation degree of lights emitted from the optical waveguide element is increased, for two adjacent regions, an overlapping phenomenon between outgoing lights on the left side and outgoing lights on the right side is greatly reduced, and the crosstalk between outgoing lights can be reduced.

In at least some embodiments, a top (light emergent surface 12) of an optical waveguide element and a bottom plate 13 of the optical waveguide element have the same refractive index. In at least some embodiments, refractive index of the top 12 of the optical waveguide element is greater than or equal to refractive index of a liquid medium 15, and the difference is less than 0.3. For example, the difference between refractive index of the top 12 of the optical waveguide element and refractive index of the liquid medium 15 is zero. While refractive index of the top 12 of the optical waveguide element is greater than that of the liquid medium 15, the difference between refractive index of the top 12 of the optical waveguide element and refractive index of the liquid medium 15 is less than 0.3. The smaller the difference between refractive index of the top 12 of the optical waveguide element and refractive index of the liquid medium 15 is, it is possible to effectively avoid any refraction taking place between the liquid medium and the top 12 of the optical waveguide element, and reduce the effect on the emergent angle of lights.

For example, refractive index of the liquid medium may be in the range of 1.45 to 1.7, and for another example, a liquid medium may have a refractive index greater than 1.7. For example, the refractive index of the liquid medium 15 is typically from 1.5 to 1.6.

When a reflector assembly is in a switch-on or switch-off state, a reflector 141 is deflected, and a medium within the optical waveguide element 10 allows the reflector assembly to deflect in the medium. Therefore, the medium is not a solid medium. Moreover, in view of the refractive index requirements for the medium, the refractive index of an ordinary gaseous medium cannot meet the requirements, and so the medium is a liquid medium.

For example, the reflector array 14 may also be called as a DMD (Digital Microreflector Device) array. DMD is an integrated microelectrical-mechanical upper-layer structure circuit unit that is made by using CMOS (Complementary Metal Oxide Semiconductor), SRAM (Static Random Access Memory) memory cells. Manufacture of DMD upper-layer structure begins with a complete CMOS memory circuit, and then an upper-layer structure in which a metal layer of aluminum and a hardened photoresistance layer alternate is fabricated by using a mask layer, The metal layer of aluminum includes an address electrode, a hinge, a yoke and a reflector, and the hardened photoresistance layer functions as a sacrificial layer, which is useful for forming two air gaps. Aluminum metal is deposited by splash plating and subjected to a plasma etching treatment, and the sacrificial layer is subjected to a plasma ashing treatment, to create the air gaps between layers.

In an embodiment of the present disclosure, by filling a liquid medium into an optical waveguide element, a part of lights incident from a light incident surface undergo total reflection within the optical waveguide element, and by arranging a reflector array at the bottom plate of the optical waveguide element, and making the reflector array be far away from the region where the light incident surface is located, lights totally reflected to the reflector array and having an incident angle less than a preset angle are directed out of a light emergent surface. Due to the liquid medium between the reflector array and the light incident surface, a part of lights incident from the light incident surface will undergo total reflection within the optical waveguide element, and a part of lights emitted by a light source with a large viewing angle will leave the optical waveguide element by refraction. Lights totally reflected to the reflector array and having an incident angle less than a preset angle are directed out of a light emergent surface by the reflector array, while lights and having an incident angle greater than the preset angle continue being totally reflected within the optical waveguide element, thus increasing the collimation degree of lights emitted from the light emergent surface. Consequently, a crosstalk problem between adjacent sections of the backlight module is effectively solved, and moreover, it is suitable for anti-peep, directional backlight modules and other products.

According to an embodiment of the present disclosure, there is further provided a backlight module, including a light source 21 and the above optical waveguide element, and the light source 21 is disposed opposite to a light incident surface 11 of the optical waveguide element.

For example, the light source 21 and the light incident surface 11 are disposed parallel to each other and disposed face to face. Regarding descriptions of the optical waveguide element, reference may be made to descriptions of foregoing embodiment, and embodiments of the present disclosure will not elaborate this herein.

Referring to FIG. 7, it is a top view illustrating a backlight module according to an embodiment of the present disclosure.

For example, the light source 21 includes a plurality of LEDs, and lights emitted by each of the LEDs are white lights. When lights emitted by each LED enter an optical waveguide element, they undergo total reflection at a preset distance between the reflector array 14 and the region where a light incident surface is located, and are totally reflected to the reflector array 14. When the reflector array 14 is switched on, lights totally reflected to the reflector array 14 and have an incident angle less than a preset angle are directed out of the light emergent surface 12. When the reflector array 14 is switched off, lights totally reflected to the reflector array 14 and have an incident angle greater than or equal to the preset angle continues being totally reflected at the light emergent surface 12.

Figure 10:
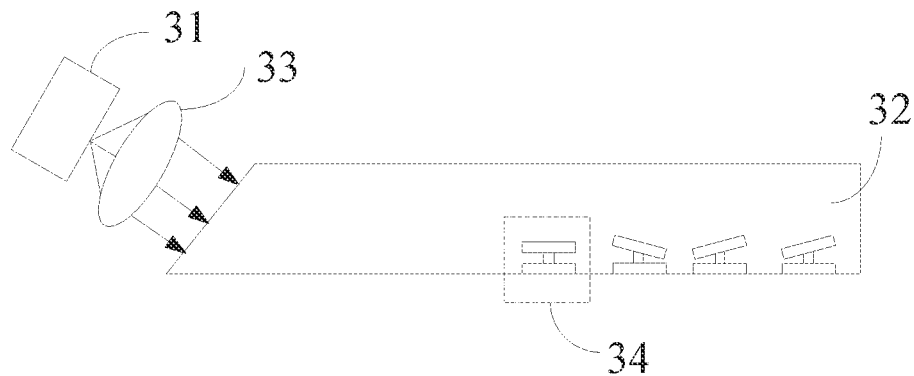
FIG. 10 is a structurally schematic diagram illustrating a backlight module according to an embodiment of the present disclosure.
Figure 11:
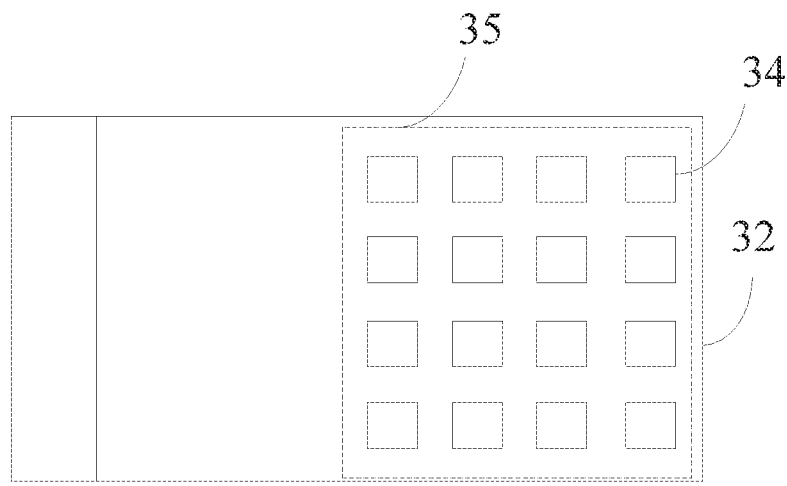
FIG. 11 is a top view of the backlight module of FIG. 10.

As illustrated in FIG. 10 and FIG. 11, in at least some embodiments, the backlight module further includes a collimating element 33 disposed between a light source 31 and an optical waveguide element 32.

Divergent lights emitted by the light source 31 enter the collimating element 33, and the collimating element 33 collimates the divergent lights emitted from the light source 31 by converting the divergent lights into parallel lights, and the collimated lights are then incident on a light incident surface of the optical waveguide element 32. The reflector array 35 includes a plurality of reflector assemblies 34. Regarding the concrete structure of reflector assemblies 34, reference may be made to descriptions in the foregoing embodiment, and details are omitted here.

For example, the collimating element is convex lens, and it may also be a concave lens or a concave reflector.

In the above embodiments, the backlight module includes a light source and an optical waveguide element. By filling a liquid medium into the optical waveguide element, a part of lights incident from a light incident surface undergo total reflection within the optical waveguide element. By arranging a reflector array at the bottom plate of the optical waveguide element, and making the reflector array be far away from the region where the light incident surface is located, lights totally reflected to the reflector array and having incident angle less than a preset angle are directed out of a light emergent surface. Due to the liquid medium between the reflector array and the light incident surface, a part of lights incident from the light incident surface will undergo total reflection within the optical waveguide element, and a part of lights emitted by the light source with a large viewing angle leave the optical waveguide element by refraction. Lights totally reflected to the reflector array and having incident angles less than a preset angle are directed out of a light emergent surface by the reflector array, while lights and having an incident angle greater than the preset angle continue being totally reflected within the optical waveguide element, thus increasing the collimation degree of lights emitted from the light emergent surface. Consequently, a crosstalk problem between adjacent sections of the backlight module is effectively solved, and moreover, it is suitable for anti-peep, directional backlight modules and other products.

According to an embodiment of the present disclosure, there is further provided a display device, including the above backlight module.

According to an embodiment of the present disclosure, there is further provided a control method of any one of aforesaid optical waveguide elements, the method includes:

controlling reflectors in the reflector array to reflect at least a part of light incident on the reflector array out of a light emergent surface or to cause the at least a part of light incident on the reflector array to continue being totally reflected at the light emergent surface.

In at least some embodiments, the controlling reflectors in the reflector array includes:

deflecting the reflectors, the reflectors being configured to be inclined relative to the light emergent surface and to reflect totally reflected lights incident on the reflectors out of the light emergent surface.

In at least some embodiments, the controlling reflectors in the reflector array includes:

deflecting the reflectors, the reflectors being configured to be parallel to the light emergent surface and to cause the lights totally reflected and being incident on the reflectors to continue being totally reflected by the light emergent surface.

Referring to FIG. 8, it is a flowchart illustrating a control method of an optical waveguide element according to an embodiment of the present disclosure, which includes:

step 801, a first reflector assembly in the reflector array is controlled to be switched on, so that the light totally reflected to the first reflector assembly and having an incident angle smaller than a preset angle is directed out of a light emergent surface in the optical waveguide element.

step 802, a second reflector assembly in the reflector array is controlled to be switched off, so that the light totally reflected to the second reflector assembly continue being totally reflected within the optical waveguide element.

For example, the reflector array 14 includes a plurality of reflector assemblies arranged in array, and a reflector assembly includes a reflector 141, a connecting member 14 and a control circuit 143. According to actual demands, the reflector assemblies in the reflector array 14 can be classified into two kinds, including a first reflector assembly and a second reflector assembly.

For example, one pixel corresponds to one reflector assembly. For example, in the case that a corresponding pixel needs to be provided with lights, an external system inputs a corresponding control signal to a control circuit, and the control circuit turns on the first reflector assembly in the reflector array 14 based on the control signal. As illustrated in FIG. 5, when the first reflector assembly is switched on, a reflector will be deflected to a designated tilt position, and direct the light totally reflected to the first reflector assembly and having an incident angle smaller than a preset angle out of a light emergent surface 12 of the optical waveguide element.

For example, when a corresponding pixel does not need lights, the control circuit switches off a second reflector assembly in the reflector array 14 based on a control signal. As illustrated in FIG. 6, when the second reflector assembly is switched off, a reflector and the light emergent surface 12 are parallel to each other, and the light totally reflected to the second reflector assembly continue being totally reflected within the optical waveguide element.

For example, the first reflector assembly and the second reflector assembly are determined by whether or not pixels in the corresponding place need light. When a pixel in a corresponding place needs light, the reflector assembly in this place is a first reflector assembly, and when a pixel in a corresponding place does not need light, the reflector assembly in this place is a second reflector assembly. It is to be noted that, there is no limit to the order of step 801 and step 802, and they can be executed simultaneously.

In an embodiment of the present disclosure, by controlling a first reflector assembly in the reflector array to be switched on, the light totally reflected to the first reflector assembly and having an incident angle less than a preset angle are directed out of a light emergent surface of the optical waveguide element. Moreover, by controlling a second reflector assembly in the reflector array to be switched off, the light totally reflected to the second reflector assembly continues being totally reflected within the optical waveguide element. Due to a liquid medium between the reflector array and the light incident surface, a part of the light incident from a light incident surface will undergo total reflection within the optical waveguide element, and a part of the light emitted by a light source with a large viewing angle leave the optical waveguide element by refraction. The light totally reflected to the reflector array and having an incident angle less than a preset angle is directed out of the light emergent surface by the reflector array, while the light having an incident angle greater than the preset angle continues being totally reflected within the optical waveguide element, thus increasing the collimation degree of lights emitted from the light emergent surface. Consequently, a crosstalk problem between adjacent sections of the backlight module is effectively solved, and moreover, it is suitable for anti-peep, directional backlight modules and other products.

In the disclosure, the following should be noted:

(1) The accompanying drawings involve only the structure(s) in connection with the embodiment(s) of the present disclosure, and other structure(s) can be referred to common design(s).

(2) For the purpose of clarity only, in accompanying drawings for illustrating the embodiment(s) of the present disclosure, the thickness and a size of a layer or area may be enlarged or narrowed, that is, the drawings are not drawn in a real scale.

(3) In case of no conflict, features in one embodiment or in different embodiments can be combined as a new embodiment.

What is described above is related to the illustrative embodiments of the disclosure only and not limitative to the scope of the disclosure; the scopes of the disclosure are defined by the accompanying claims.

The invention claimed is:

1. An optical waveguide element, comprising:
a cavity;
a light incident surface and a light emergent surface, a light entering the cavity from the light incident surface is configured to propagate and be totally reflected in the cavity; and
a reflector array, located in the cavity and configured to be controllable to cause at least part of the light incident on the reflector array to be reflected out of the light emergent surface or to continue being totally reflected at the light emergent surface, wherein the reflector array comprises a plurality of reflecting assemblies arranged in an array, each of the plurality of the reflecting assemblies comprises a reflector, the reflector is deflectable and configured to reflect the at least part of the light incident on the reflector out of the light emergent surface while the reflector is in a first state.

2. The optical waveguide element according to claim 1, wherein the reflector is configured to reflect the at least part of the light incident on the reflector and has an incident angle less than a preset angle out of the light emergent surface.

3. The optical waveguide element according to claim 1, wherein the reflector is further configured to cause the at least part of the light incident on the reflector to continue being totally reflected at the light emergent surface while the reflector in a second state.

4. The optical waveguide element according to claim 3, wherein the reflector in each of the plurality of the reflector assemblies is configured to be inclined relative to the light emergent surface in the first state, and to be parallel to the light emergent surface in the second state.

5. The optical waveguide element according to claim 1, wherein each of the plurality of the reflecting assemblies further comprises:
a connecting member, connected to each reflector and configured to control a deflection angle of the reflector; and
a control circuit, coupled to the connecting member and configured to input a reflector deflection signal to the connecting member.

6. The optical waveguide element according to claim 1, wherein a minimum distance between the reflector array and the light incident surface is set in such a way that the light entering the cavity from the light incident surface are incident on the reflector array after the light undergoes multiple-time total reflection.

7. The optical waveguide element according to claim 1, further comprising:
a bottom plate, disposed opposite to the light emergent surface;
a medium, filled in the cavity; and
a packaging surface, disposed opposite to the light incident surface and provided with a hole, the hole being configured for injection of the medium.

8. The optical waveguide element according to claim 7, wherein the light incident surface is a slop surface, the slop surface is inclined relative to the bottom plate, and an angle between the light incident surface and the light emergent surface is an obtuse angle.

9. The optical waveguide element according to claim 7, further comprising: a first connecting surface, wherein the light incident surface extends beyond the light emergent surface, the first connecting surface is joined to the light emergent surface and one end of the light incident surface extending beyond the light emergent surface, respectively, and the cavity is enclosed by the light incident surface, the first connecting surface, the light emergent surface, the bottom plate, and the packaging surface to form a closed cavity.

10. The optical waveguide element according to claim 7, wherein the light incident surface is directly connected to the light emergent surface and the bottom plate, respectively, and the cavity is enclosed by the light incident surface, the light emergent surface, the bottom plate, and the packaging surface to form a closed cavity.

11. The optical waveguide element according to claim 7, wherein the medium is a liquid medium, the liquid medium is configured to allow the light entering the light incident surface to propagate in the liquid medium and allow the at least part of the light to be totally reflected, the reflector array is located in the liquid medium.

12. The optical waveguide element according to claim 11, wherein a refractive index of a material of the light emergent surface is greater than a refractive index of the liquid medium, and a difference between the refractive index of the material of the light emergent surface and the refractive index of the liquid medium is less than 0.3.

13. The optical waveguide element according to claim 11, wherein a refractive index of a material of the light emergent surface is equal to a refractive index of the liquid medium.

14. A control method of the optical waveguide element according to claim 1, comprising:
controlling reflectors in the reflector array to cause the at least part of light incident on the reflector array to be reflected out of a light emergent surface or to continue being totally reflected at the light emergent surface.

15. The control method according to claim 14, wherein the controlling reflectors in the reflector array comprises:
deflecting the reflectors, the reflectors being configured to be inclined relative to the light emergent surface and to reflect the lights totally reflected and being incident on the reflectors out of the light emergent surface.

16. The control method according to claim 14, wherein the controlling reflectors in the reflector array comprises:
deflecting the reflectors, the reflectors being configured to be parallel to the light emergent surface and to cause the lights totally reflected and being incident on the reflectors to continue being totally reflected by the light emergent surface.

17. A backlight module, comprising
a light source; and
an optical waveguide element, comprising:
a cavity;
a light incident surface and a light emergent surface, a light entering the cavity from the light incident surface is configured to propagate and be totally reflected in the cavity; and
a reflector array, located in the cavity and configured to be controllable to cause at least a part of the light incident on the reflector array to be reflected out of the light emergent surface or to continue being totally reflected at the light emergent surface,
wherein the reflector array comprises a plurality of reflecting assemblies arranged in an array, each of the plurality of the reflecting assemblies comprises a reflector, the reflector is deflectable and configured to reflect the at least part of the light incident on the reflector out of the light emergent surface while the reflector is in a first state,
wherein the light source and a light incident surface of the optical waveguide element are disposed opposite to each other.

18. The backlight module according to claim 17, further comprising: a collimating element disposed between the light source and the optical waveguide element, wherein the collimating element is configured to convert a light emitted by the light source into a collimated light, and the collimated light are incident on the light incident surface of the optical waveguide element.

19. A display device, comprising a backlight module, the backlight module comprises:
a light source; and
an optical waveguide element, comprising:
a cavity;

a light incident surface and a light emergent surface, a light entering the cavity from the light incident surface is configured to propagate and be totally reflected in the cavity; and a reflector array, located in the cavity and configured to be controllable to cause at least a part of the light incident on the reflector array to be reflected out of the light emergent surface or to continue being totally reflected at the light emergent surface, wherein the reflector array comprises a plurality of reflecting assemblies arranged in an array, each of the plurality of the reflecting assemblies comprises a reflector, the reflector is deflectable and configured to reflect the at least part of the light incident on the reflector out of the light emergent surface while the reflector is in a first state, wherein the light source and a light incident surface of the optical waveguide element are disposed opposite to each other.

* * * * *